(12) United States Patent
Holzer et al.

(10) Patent No.: US 7,052,774 B2
(45) Date of Patent: May 30, 2006

(54) PRINTABLE POLYPROPYLENE FILM HAVING ANTI-FOG PROPERTIES

(75) Inventors: Susanne Holzer, Ottweiler (DE); Gerhard Wieners, Frankfurt (DE)

(73) Assignee: Trespaphan GmbH, Neunkirchen (DE)

( * ) Notice: Subject to any disclaimer, the term of this patent is extended or adjusted under 35 U.S.C. 154(b) by 0 days.

(21) Appl. No.: 10/471,921

(22) PCT Filed: Mar. 13, 2002

(86) PCT No.: PCT/EP02/02758

§ 371 (c)(1),
(2), (4) Date: Sep. 16, 2003

(87) PCT Pub. No.: WO02/074535

PCT Pub. Date: Sep. 26, 2002

(65) Prior Publication Data

US 2004/0110018 A1    Jun. 10, 2004

(30) Foreign Application Priority Data

Mar. 16, 2001 (DE) .............................. 101 13 281

(51) Int. Cl.
*B32B 27/18* (2006.01)

(52) U.S. Cl. .................. 428/516; 428/523; 428/910

(58) Field of Classification Search ............... 428/516, 428/523, 910
See application file for complete search history.

(56) References Cited

U.S. PATENT DOCUMENTS

| 4,876,146 A | 10/1989 | Isaka et al. ................. 428/347 |
| 5,972,519 A * | 10/1999 | Niessner et al. ......... 428/474.4 |
| 6,248,850 B1 * | 6/2001 | Arai ........................... 526/347 |

FOREIGN PATENT DOCUMENTS

| EP | 0 578 192 A2 | 1/1994 |
| EP | 0 701 898 A1 | 3/1996 |
| EP | 0 860 272 A2 | 8/1998 |
| EP | 0 867 277 A2 | 9/1998 |
| WO | WO 97/22655 | 6/1997 |

* cited by examiner

*Primary Examiner*—D. S. Nakarani
(74) *Attorney, Agent, or Firm*—Dickinson Wright PLLC

(57) ABSTRACT

The invention relates to a biaxially oriented polypropylene multilayer film, which comprises at least one base layer (B), an intermediate layer (I) and a top layer (I), and which contains anti-fog additives. The anti-fog additive is only added to the intermediate layer (I) in a quantity ranging from 0.5 to 8 wt. % with regard to the weight of the intermediate layer, and the film contains a maximum of 0.5 to <1 wt. % of anti-fog additives with regard to the total weight of the film. The film is suited for packaging moist goods.

23 Claims, No Drawings

PRINTABLE POLYPROPYLENE FILM HAVING ANTI-FOG PROPERTIES

CROSS-REFERENCE TO RELATED APPLICATION

This application is a National Stage of International Application No. PCT/EP02/02758, filed on Mar. 13, 2002.

The invention relates to a biaxially oriented multilayer polypropylene film which includes at least one base layer B, an interlayer Z and a top layer D and which comprises one or more antifogging additives.

Films having particular antifogging properties are known from the prior art. Antifogging properties are an important prerequisite in film packaging for readily perishable foods having a high moisture content, such as salad, fresh fruit, for example berry fruit, and vegetables. These are, for example, packaged directly in film bags as wrap packaging or in trays covered or wrapped with a transparent film. A film which is suitable for this purpose must have good transparency and suppress condensation of the moisture in the form of drops on the film surface.

In films which have no or poor antifogging property, the moisture content of the packaged foods results in the formation of water drops due to condensation on the film surface. This drop formation impairs firstly the transparency and secondly the shelf life of the pack contents. The drops do not adhere to the film surface to an unlimited extent, and the moisture dripping down accelerates rotting and the formation of mould on the food. In addition, the drops on the film surface act like a focusing lens on incidence of light. Films having antifogging properties prevent this damaging action of drop-form water-vapor condensation.

The antifogging properties of the film can be achieved by coating the film with an antifogging solution. Alternatively, the incorporation of antifogging additives into the film itself is known. Antifogging additives are generally bivalent compounds which have a nonpolar aliphatic region for anchoring in the polyolefin matrix and a polar hydrophilic region which is able to interact with water. This polar region effects the incompatibility of antifogging additives with polyolefin, promoting migration of the additives to the film surface. The polar region here faces outwards and is thus able to interact with water. The antifogging additive reduces the contact angle and causes the formation of a uniform transparent water film on the film surface and thus prevents undesired drop formation.

This desired action can be achieved well and reliably on polyethylene films. By contrast, it proves to be significantly more difficult to produce polypropylene films having good antifogging properties. For unexplained reasons, the migration behavior of the antifogging additives in polyethylene appears to be different from that in polypropylene.

EP 0739398B1 describes a film having antifogging properties. These are achieved through a combination of three different additives in at least one outer layer. The film comprises from 1 to 5% by weight of this three-component combination.

W/O 97/13640 describes a multilayer film which comprises an antifogging additive in one of the outer layers. This antifogging additive-containing top layer is built up from polyethylene. The film preferably has three layers.

The polypropylene antifogging films known from the prior art are disadvantageous with respect to the printability and/or transparency or the hot-tack properties of the film. Furthermore, the known films are unsatisfactory with respect to the antifogging properties, in particular also with respect to the long-term stability of these properties.

The object of the present invention was to provide a film having good antifogging properties which are stable in the long term. At the same time, the film should have very good optical properties, i.e. high transparency and good gloss, and heat-sealing properties, in particular good hot-tack. It is likewise required that the film be printable on at least one side, if possible the outer side.

This object is achieved in accordance with the invention by a biaxially oriented multilayer polypropylene film which includes at least one base layer B, an interlayer I and a top layer I and which comprises antifogging additives, where the antifogging additive is only added to the interlayer I in an amount of from 0.5 to 8% by weight, based on the weight of the interlayer, and the film comprises a maximum of from 0.5 to <1% by weight of antifogging additives, based on the total weight of the film.

In accordance with the invention, the film includes at least three layers and consists of a base layer B and an inner interlayer Z and a top layer D applied to the inner interlayer, in accordance with the layer structure BZD.

For the purposes of the present invention, the base layer is the layer which has the greatest layer thickness and makes up at least 40%, preferably from 50 to 90%, of the total film thickness. Top layers are the layers which form the outer layers. Interlayers are of course provided between other layers present, in general between the base layer and a top layer. The inner interlayer is provided on the side of the film which later faces the packaged product.

In a further embodiment, the film consists of a base layer B, interlayers Z applied to both sides, and top layers D applied to the interlayers, i.e. a five-layer structure DZBZD. In a further preferred embodiment, the film consists of a base layer B, an interlayer Z applied to one side thereof, and top layers D applied to the base layer and the interlayer, in accordance with DBZD. If desired, these base structures comprising three, four or five layers may comprise further interlayers. The interlayers Z and the top layers D may be built up from raw materials which are different from one another.

The base layer of the film generally comprises at least 90% by weight, preferably from 95 to 100% by weight, in particular from 98 to <100% by weight, in each case based on the base layer, of a propylene polymer described below. No antifogging additive is added to this base layer.

It has been found that a polypropylene base layer without addition of antifogging additive advantageously contributes to the desired property profile of the film. Surprisingly, it has been found that the antifogging additives only migrate from the interlayer I to the first inner surface of the film, and the base layer acts as an effective migration barrier to the antifogging additive. This barrier action is so pronounced that the second outer top layer can be corona- or flame-treated in order to improve the printability. In spite of this treatment, the migration-promoting action of this corona or flame treatment does not arise. It was expected that corona treatment of the film on both sides would result in migration of the antifogging additive to both surfaces of the film. In particular, this was to be expected at the comparatively high concentrations of antifogging additive in the interlayer. It is known in principle from comparable film formulations in the prior art that an "empty" base layer can promote targeted migration of migrating additives to a film surface. However, this has hitherto only been described for formulations in which the total content of migrating additives is kept very low. However, such small amounts of antifogging additives did not exhibit the desired action.

The propylene polymer of the base layer comprises at least >98 to 100% by weight of propylene. The corresponding comonomer content of from 0 to at most 2% by weight, based on the propylene, generally consists, if present, of ethylene. Isotactic propylene homopolymer is preferred.

The propylene homopolymer generally has a melting point of from 140 to 170° C., preferably from 150 to 165° C., and generally has a melt flow index (measurement DIN 53 735 at a load of 21.6 N and 230° C.) of from 1.5 to 20 g/10 min, preferably from 2 to 15 g/10 min. The n-heptane-soluble content of the isotactic polymer is generally from 1 to 6% by weight, based on the polymer. If desired, the propylene polymer of the base layer may be peroxidically degraded.

In general, the base layer comprises conventional stabilizers and neutralizers in effective amounts in each case, and optionally lubricants and/or antistatics. All the following data in % by weight relate to the weight of the base layer.

Stabilizers which can be employed are the conventional compounds which have a stabilizing action for ethylene, propylene and other alpha-olefin polymers. They are added in an amount of between 0.05 and 2% by weight. Particularly suitable are phenolic stabilizers, alkali/alkaline earth metal stearates and/or alkali/alkaline earth metal carbonates. Phenolic stabilizers are preferred in an amount of from 0.1 to 0.6% by weight, in particular from 0.15 to 0.3% by weight, and having a molecular weight of greater than 500 g/mol. Pentaerythrityl tetrakis-3-(3,5-di-tertiary-butyl-4-hydroxyphenyl)propionate or 1,3,5-trimethyl- 2,4,6-tris(3,5-di-tertiary-butyl-4-hydroxybenzyl)benzene are particularly advantageous.

Neutralizers are preferably dihydrotalcite, calcium stearate and/or calcium carbonate having a mean particle size of at most 0.7 μm, an absolute particle size of less than 10 μm and a specific surface area of at least 40 m/g.

Suitable lubricants for the antifogging film according to the invention are higher aliphatic acid amides made from an amine and a water-insoluble monocarboxylic acid (so-called fatty acids) having from 8 to 24 carbon atoms, preferably from 10 to 18 carbon atoms. Erucamide, stearamide and oleamide are preferred. Lubricants are usually added in an amount of from 0.1 to 0.3% by weight, based on the base layer.

Preferred antistatics are the essentially straight-chain and saturated aliphatic, tertiary amines having an aliphatic radical having from 10 to 20 carbon atoms which are substituted by hydroxy-(C1–C4)-alkyl groups, where N,N-bis(2-hydroxyethyl)alkylamines having from 10 to 20 carbon atoms, preferably from 12 to 18 carbon atoms, in the alkyl radical are particularly suitable. Further suitable antistatics are monoesters of glycerol and aliphatic fatty acids, where fatty acid radicals having from 10 to 20 carbon atoms are preferred. Particular preference is given to glycerol monostearate. Antistatics are usually added in an amount of from 0.1 to 0.3% by weight. In general, the addition of antistatics is not necessary.

The polypropylene film according to the invention furthermore comprises a first inner interlayer I applied to the base layer and optionally a second interlayer II provided on the opposite side of the base layer. The inner interlayer I is built up from polymers of olefins having from 2 to 10 carbon atoms, preferably propylene copolymers and/or terpolymers whose propylene content is 70–98% by weight, preferably from 90 to <98% by weight, based on the propylene. In general, the interlayer I comprises 92–99.5% by weight, preferably 95–99% by weight, of these propylene polymers.

Examples of olefinic polymers of this type are
a copolymer of
ethylene and propylene or
ethylene and 1-butylene or
propylene and 1-butylene or
a terpolymer of
ethylene and propylene and 1-butylene or
a blend or mixture of two or more of the said homopolymers, copolymers and terpolymers,
where, in particular, random ethylene-propylene copolymers having an ethylene content of from 1 to 10% by weight, preferably from 2.5 to 8% by weight, or random propylene-1-butylene copolymers having a butylene content of from 2 to 25% by weight, preferably from 4 to 20% by weight, in each case based on the total weight of the copolymer, or
random ethylene-propylene-1-butylene terpolymers having an ethylene content of from 1 to 10% by weight, preferably from 2 to 6% by weight, and a 1-butylene content of from 2 to 20% by weight, preferably from 4 to 20% by weight, in each case based on the total weight of the terpolymer, or
a blend of an ethylene-propylene-1-butylene terpolymer and a propylene-1-butylene copolymer having an ethylene content of from 0.1 to 7% by weight and a propylene content of from 50 to 90% by weight and a 1-butylene content of from 10 to 40% by weight, in each case based on the total weight of the polymer blend, are preferred.

The above-described copolymers and terpolymers employed in the inner interlayer I generally have a melt flow index of from 1.5 to 30 g/10 min, preferably from 3 to 15 g/10 min. The melting point is preferably in the range from 120 to 140° C. The above-described blend of copolymers and terpolymers has a melt flow index of from 5 to 9 g/10 min and a melting point of from 120 to 150° C. All the melt flow indices indicated above are measured at 230° C. and a force of 21.6 N (DIN 53 735).

In accordance with the invention, the first, inner interlayer I comprises from 0.5 to 8% by weight, preferably from 1 to 5% by weight, of antifogging additive, based on the weight of the interlayer. The amount of antifogging additive in the interlayer is at the same time selected in such a way that the total amount of antifogging additive, based on the film, is at least from 0.4 to <1% by weight, preferably 0.6–<1% by weight. In accordance with the invention, this amount of additive is only added to the inner interlayer I.

Surprisingly, the specific formulation of the film with high additive contents only in the interlayer I makes it possible to achieve various desired service properties of the film alongside one another. The film exhibits the desired antifogging properties, in particular these are surprisingly uniform and stable in the long term. The interlayer forms an additive depot from which the additive can continue to migrate over a long time, so that drop formation on the films does not occur, even after several days, when these are used for the packaging of moist foods. At the same time, the disadvantageous effects of the antifogging additives on the transparency and hot tack surprisingly do not occur. In spite of good antifogging properties, the film exhibits good hot tack and very good transparency.

Antifogging additives are generally bivalent compounds which have a nonpolar aliphatic region for anchoring in the polyolefin matrix and a polar hydrophilic region which is able to interact with water/aqueous systems. This polar region causes the incompatibility of antifogging additives with polypropylene, which results in migration of the additives to the film surface, where the polar region is directed outwards and is thus able to interact with water. The antifogging additive reduces the contact angle and thus allows the formation of a continuous transparent water film on the film surface.

Antifogging additives are thus surface-active additives which are preferably employed as a combination of various substance classes. Suitable substances which are employed in combination with one another as antifogging additive are, for example, described in WO 97/22655, which is expressly incorporated herein by way of reference. Preferred components of the combination are fatty acid esters and derivatives thereof, aliphatic alcohols and esters thereof, polyethoxylated aromatic alcohols, mono- or polyesterified sorbitol esters, mono- or polyesterified glycerol esters, mixed glycerol esters, ethoxylated sorbitan esters and ethoxylated amines. The above-mentioned esters are generally based on esterification of the respective acid or alcohol functions with medium- or long-chain fatty acids.

In a preferred embodiment, the interlayer I comprises an active-ingredient combination from the three substance classes: glycerol esters, sorbitol esters and ethoxylated amines. In this embodiment, the interlayer I comprises in total 3–5% by weight of the active-ingredient combination from the said different substance classes, in each case based on the weight of the interlayer I.

The antifogging additives can be incorporated into the film directly or via a concentrate, a so-called masterbatch. Masterbatches of this type are polyolefins which comprise the antifogging additives in an increased concentration compared with the film layer, generally 30–80% by weight, preferably 40–60% by weight of the additive, based on the total weight of the concentrate. The polyolefins of the masterbatch are generally standard polyethylenes or polypropylenes as described for the film of the present invention.

Antifogging additives and corresponding masterbatches are prior art per se and are commercially available.

The polypropylene film according to the invention can have a second interlayer II comprising polymers of olefins having from 2 to 10 carbon atoms applied to the second surface of the base layer.

This second interlayer II preferably consists of 98–100% by weight of the polypropylene raw materials described for the base layer, where the propylene homopolymer employed in the second interlayer II comprises at least >98–100% by weight of propylene and generally has a melting point of 140° C. or above, preferably from 150 to 170° C. Isotactic homopolypropylene having an n-heptane-soluble content of 6% by weight or less, based on the isotactic homopolypropylene, is preferred. The homopolymer generally has a melt flow index of from 1.5 g/10 min to 20 g/10 min, preferably from 2.0 g/10 min to 15 g/10 min.

In a further embodiment, blends of the propylene homopolymer with propylene copolymers or terpolymers are also possible. The copolymers and terpolymers which can be employed in such blends have already been described as polymers for the inner interlayer I. Mixtures for the interlayer II comprise a maximum of 30% by weight, preferably from 1 to 10% by weight, based on the interlayer II, of the said copolymers or terpolymers.

Furthermore, in general both interlayers I and II additionally comprise the stabilizers and neutralizers described for the base layer in the corresponding amounts based on the weight of the interlayer. If desired, the interlayer II may additionally comprise conventional lubricants and antistatics. However, no antifogging additives are added to the second interlayer II.

The thickness of the interlayers I is generally in the range from 0.2 to 10 μm, preferably in the range from 0.4 to 8 μm, in particular from 1 to 6 μm. The thickness of the interlayer II is generally in the range from 0.2 to 15 μm, preferably 1–10 μm.

The polypropylene film according to the invention furthermore comprises a top layer, referred to below as inner top layer I, applied to the inner interlayer I. On use, it faces the pack contents. If desired, there is additionally a second top layer II provided on the opposite side, i.e. on the second surface of the base layer or interlayer II.

The inner top layer I is generally built up from polymers of olefins having from 2 to 10 carbon atoms, preferably propylene copolymers or terpolymers whose propylene content is at least 50% by weight, preferably 70–98% by weight. In general, the inner top layer I comprises 95–100% by weight, preferably 98–<100% by weight, of the propylene copolymers or terpolymers described.

Examples of olefinic polymers of this type are
a copolymer of
ethylene and propylene or
ethylene and 1-butylene or
propylene and 1-butylene or
a terpolymer of
ethylene and propylene and 1-butylene or
a blend or mixture of two or more of the said homopolymers, copolymers and terpolymers,
where, in particular, random ethylene-propylene copolymers having an ethylene content of from 1 to 10% by weight, preferably from 2.5 to 8% by weight, or random propylene-1-butylene copolymers having a butylene content of from 2 to 25% by weight, preferably from 4 to 20% by weight, in each case based on the total weight of the copolymer, or
random ethylene-propylene-1-butylene terpolymers having an ethylene content of from 1 to 10% by weight, preferably from 2 to 6% by weight, and a 1-butylene content of from 2 to 20% by weight, preferably from 4 to 20% by weight, in each case based on the total weight of the terpolymer, or
a blend of an ethylene-propylene-1-butylene terpolymer and a propylene-1-butylene copolymer having an ethylene content of from 0.1 to 7% by weight and a propylene content of from 50 to 90% by weight and a 1-butylene content of from 10 to 40% by weight, in each case based on the total weight of the polymer blend, are preferred.

The above-described copolymers and terpolymers employed in the inner top layer I generally have a melt flow index of from 1.5 to 30 g/10 min, preferably from 3 to 15 g/10 min. The melting point is in the range from 120 to 140° C. The above-described blend of copolymers and terpolymers has a melt flow index of from 5 to 9 g/10 min and a melting point of from 120 to 150° C. All the melt flow indices indicated above are measured at 230° C. and a force of 21.6 N (DIN 53 735).

The polypropylene film according to the invention may have a second top layer II of propylene polymers applied to the base layer or the interlayer II. This second top layer II consists (98–100% by weight), where present, of the propylene copolymers or terpolymers described for the top layer I, or alternatively of the propylene homopolymers described for the base layer, where the propylene homopolymer employed in the second top layer II consists predominantly (>98–100% by weight) of propylene and generally has a melting point of 140° C. or above, preferably from 150 to 170° C., where isotactic homopolypropylene having an n-heptane-soluble content of 6% by weight or less, based on the isotactic homopolypropylene, is preferred. The homopolymer generally has a melt flow index of from 1.5 g/10 min to 20 g/10 min, preferably from 2.0 g/10 min to 15 g/10 min.

The suitable propylene copolymers or terpolymers, which comprise at least 50% by weight of propylene units, have already been described above for the top layer I. These are likewise particularly suitable for top layer II. This embodiment can also be corona- or flame-treated on the surface of the top layer II.

In order to improve the printability of the top layer II, blends of the above-described propylene homopolymer with copolymers or terpolymers can also be employed. The copolymers and terpolymers used in such mixtures in the second top layer II have already been described for the inner top layer I. In general, mixtures of this type for the top layer II comprise from 1 to 30% by weight, preferably from 1 to 20% by weight, of the copolymers or terpolymers. In general, no antifogging additives are added to the second top layer II.

The top layers I and II may comprise the stabilizers and neutralizers described for the base layer in the corresponding amounts based on the weight of the corresponding layer. In a preferred embodiment, the top layers I and/or II comprise antiblocking agents described below. No antifogging additives are added to either the first inner top layer I or the second top layer II, like the base layer and the second interlayer II. In accordance with the invention, the antifogging additives are only added to the inner interlayer I, which functions as additive depot.

It goes without saying that small amounts of antifogging additive may be present in the other layers of the film, for example due to conventional processing of film regrind. However, this amount must be kept so small that interfering amounts do not migrate to the second outer surface of the film. In general, the base layer should comprise less than 1% by weight of these antifogging additives via film regrind. In such an amount, the antifogging additives do not have a disadvantageous effect on the desired film properties in the base layer.

Suitable antiblocking agents for the top layers I and/or II are inorganic additives, such as silicon dioxide, calcium carbonate, magnesium silicate, aluminium silicate, calcium phosphate and the like and/or incompatible organic polymers, such as polyamides, polyesters, polycarbonates and the like, preferably benzoguanamine-formaldehyde polymers, silicon dioxide and calcium carbonate. The effective amount of antiblocking agent, preferably $SiO_2$, is in the range from 0.1 to 2% by weight, preferably from 0.1 to 0.8% by weight. The mean particle size is between 1 and 6 µm, in particular 2 and 5 µm, where particles having a spherical shape, as described in EP-A-0 236 945 and DE-A-38 01 535, are particularly suitable.

The thickness of the top layer(s) I and II is generally greater than 0.2 µm and is preferably in the range from 0.4 to 3 µm, in particular from 0.5 to 1.5 µm. The thickness of the respective top layers may be selected independently of one another.

The total thickness of the polypropylene film according to the invention can vary within broad limits and depends on the intended use. It is preferably from 4 to 120 µm, in particular from 5 to 80 µm, preferably from 7 to 50 µm, with the base layer making up from about 40 to 95% of the total film thickness.

The invention furthermore relates to a process for the production of the polypropylene film according to the invention by the coextrusion process, which is known per se.

In this process, firstly, as usual in the coextrusion process, the polymer or polymer mixture of the individual layers is compressed and liquefied in an extruder, where any additives added may already be present in the polymer or in the polymer mixture or are incorporated as a masterbatch. The melts are then forced simultaneously through a flat-film die (slot die), and the extruded multilayer film is taken off on one or more take-off rolls, during which it cools and solidifies.

The resultant film is then stretched longitudinally and transversely to the extrusion direction, resulting in orientation of the molecule chains. The longitudinal stretching is advantageously carried out with the aid of two rolls running at different speeds in accordance with the target stretching ratio, and the transverse stretching is advantageously carried out with the aid of a corresponding tenter frame. The longitudinal stretching ratios are in the range from 4 to 9, preferably from 4.5 to 8.5. The transverse stretching ratios are in the range from 5 to 10, preferably from 6 to 9.

The biaxial stretching of the film is followed by heat-setting (heat treatment) thereof, during which the film is held at a temperature of from 60 to 160° C. for about 0.1 to 20 seconds. The film is subsequently wound up in a conventional manner using a wind-up device.

It has proven particularly favorable to hold the take-off roll or rolls by means of which the extruded film is cooled and solidified at a temperature of from 10 to 100° C., preferably from 20 to 70° C., by means of a heating and cooling circuit.

The temperatures at which longitudinal and transverse stretching are carried out can vary in a relatively large range and depend on the desired properties of the film. In general, the longitudinal stretching is preferably carried out at from 80 to 150° C. and the transverse stretching preferably at from 120 to 180° C.

After the biaxial stretching, one or both surface(s) of the film is (are) preferably plasma-, corona- or flame-treated by one of the known methods. The treatment intensity is generally in the range from 36 to 50 mN/m, preferably from 38 to 45 mN/m. In the case of treatment on one side, it is possible to treat only the inner surface of the film.

In preferred embodiments, however, either both surfaces of the film or the surface of the top layer II (i.e. the outer film side) are treated. It was originally expected that single-sided corona treatment on the surface of the top layer I (i.e. the inner film side) would have a particularly advantageous effect on the film properties since a migration-promoting action is ascribed to corona treatment. It has been found that this supporting action is surprisingly unnecessary. The antifogging additives migrate to the "correct" inner film surface even on treatment on both sides or on treatment on the outer film side. In addition, it has been found that single-sided corona treatment on the inner film side results in interfering taste impairment of the packaged product in the case of individual antifogging combinations. Thus, although single-sided "inner" corona treatment is possible, it is not, however, necessary and is also not always advantageous.

The corona treatment is advantageously carried out by passing the film between two conductor elements serving as electrodes, with such a high voltage, usually an alternating voltage (from about 5 to 20 kV and from 5 to 30 kHz), being applied between the electrodes that spray or corona discharges are able to occur. The spray or corona discharge causes the air above the film surface to ionize and react with the molecules of the film surface, resulting in the formation of polar inclusions in the essentially nonpolar polymer matrix.

The multilayer film according to the invention is distinguished by its excellent suitability as antifogging film for the packaging of products having a high moisture content. It has been found that the multilayer structure in combination with the particular formulation of the individual layers ensures the advantageous action of the antifogging additives known per se, but at the same time their disadvantageous effect, such as hazing of the film, poorer printability, impaired hot tack, is avoided.

Surprisingly, the exclusive formulation of the inner interlayer I with comparatively high concentrations of antifogging additives is sufficient to achieve constantly good antifogging properties of the film. The interlayer I functions as additive depot and allows sufficiently fast, but also long-lasting and targeted migration of the antifogging additive to the inner top layer I. A consistent antifogging property which is constant over time is thus ensured.

It has been found that, due to the film composition according to the invention, the antifogging additives do not significantly increase the haze of the film. This is vital for a transparent packaging film which is intended to present the pack contents in a visually attractive manner.

Surprisingly, high additive concentrations only in the interlayer I achieve better results with respect to the antifogging properties than the combination of antifogging additives in the base layer and the top layer.

Surprisingly, the base layer forms an effective barrier to migration of the antifogging additive to the surface of the top layer II. This barrier action is retained even on surface treatment of the top layer II by corona or flame. Thus, the film can be surface-treated on one or both sides, with the antifogging additive nevertheless migrating only to the surface of the inner top layer I. The outer surface can, if necessary, be provided with a print. In addition, the film has better hot-tack properties than antifogging films of the prior art. A film is thus provided which has a particularly advantageous property combination. The film has antifogging properties which are particularly stable and uniform in the long term and still has very good transparency, good hot-tack properties and can be printed in the desired manner on the outer side II.

The invention is explained in greater detail by the following examples.

EXAMPLE 1

A transparent four-layer film consisting of the base layer B, an inner interlayer Z1, an inner top layer D1 and an outer top layer D2 with a total thickness of 30 μm was produced by coextrusion and subsequent stepwise orientation in the longitudinal and transverse directions. The outer top layer D2 had a thickness of 0.7 μm, the inner interlayer Z1 had a thickness of 4 μm and the inner top layer D1 had a thickness of 1.0 μm. Both top layers of the film were corona-treated. The total content of antifogging additives in the film was 0.67% by weight, based on the total weight of the film. The layers had the following composition:

Base Layer B:
99.84% by weight of propylene homopolymer having a melting point of 165° C. and a melt flow index of 3.4 g/10 min and a chain isotacticity index of 94%
0.03% by weight of neutralizer (CaCO3)
0.13% by weight of stabilizer (Irganox)

Inner Interlayer I:
95.0% by weight of random copolymer of ethylene and propylene having a melt flow index of 6.0 g/10 min and an ethylene content of 6% by weight, based on the copolymer
5.0% by weight of antifogging additive combination comprising
  ⅓—sorbitan monostearate
  ⅓—ethoxylated sorbitan oleate
  ⅓—glycerol dioleate Inner Top Layer I:
99.5% by weight of random copolymer of ethylene and propylene having a melt flow index of 6.0 g/10 min and an ethylene content of 6% by weight, based on the copolymer
0.5% by weight of SiO2 as antiblocking agent having a mean particle size of 4 μm Outer Top Layer II:
89.7% by weight of propylene homopolymer having a melting point of 165° C. and a melt flow index of 3.4 g/10 min and a chain isotacticity index of 94%, with 0.03% by weight of neutralizer (CaCO3) and 0.13% by weight of stabilizer (Irganox)
10.0% by weight of random copolymer of ethylene and propylene having a melt flow index of 6.0 g/10 min and an ethylene content of 6% by weight, based on the copolymer
0.3% by weight of SiO2 as antiblocking agent having a mean particle size of 4 μm The production conditions in the individual process steps were:

| Extrusion: | Temperatures | Base layer B: | 260° C. |
|---|---|---|---|
| | | Interlayer 21: | 250° C. |
| | | Top layer D1: | 250° C. |
| | | Top layer D2: | 250° C. |
| | | Temperature of the take-off roll | 20° C. |
| Longitudinal stretching: | | Temperature: | 110° C. |
| | | Longitudinal stretching ratio: | 1:5 |
| Transverse stretching: | | Temperature: | 165° C. |
| | | Transverse stretching ratio: | 1:9 |
| Setting: | | Temperature: | 140° C. |
| | | Convergence: | 10% |
| Print pretreatment | Top layer I and II | Corona 10,000 V/10,000 Hz | |

The transverse stretching ratio of 1:9 is an effective value. This effective value is calculated from the final film width B reduced by twice the hem width b, divided by the width of the longitudinally stretched film C, likewise reduced by twice the hem width b.

The film was produced without problems and was distinguished by excellent properties:
  very good printability on the outer surface and
  good hot-tack properties and
  very good antifogging properties

EXAMPLE 2

Analogously to Example 1, a transparent five-layer film with an additional outer interlayer II was produced. This second interlayer II was located between the base layer B and the outer top layer II and consisted of a propylene homopolymer having a melting point of 165° C. and a melt flow index of 3.4 g/10 min and a chain isotacticity index of 94%.

The total thickness of the film was 30 μm. The outer top layer I had a thickness of 0.7 μm, the outer interlayer II had a thickness of 2 μm, the inner interlayer I had a thickness of 4 μm and the inner top layer I had a thickness of 1.0 μm. The total content of antifogging additives in the film was 0.67% by weight, based on the total weight of the film.

EXAMPLE 3

As in Example 2, a transparent five-layer film was produced. In contrast to Example 2, the copolymer in the inner interlayer I and the inner top layer I was replaced by a random ethylene-propylene-butylene terpolymer. The random ethylene-propylene-butylene terpolymer has an ethylene content of 3% by weight and a butylene content of 7% by weight (remainder propylene) and was stabilized with 0.07% of both Irganox 1010 and Irgafos 168 and 0.03% of DHT. The melt flow index is 7.3 g/10 min. The total content of antifogging additives in the film was 0.67% by weight, based on the total weight of the film. This enabled the hot-tack properties of the film to be additionally improved.

EXAMPLE 4

As in Example 3, a transparent five-layer film was produced. In contrast to Example 3, 20% of a random copolymer of ethylene and propylene having a melt flow index of 6.0 g/10 min and an ethylene content of 6% by weight, based on the copolymer, were admixed with the outer interlayer II. The content of propylene homopolymer was reduced correspondingly. The total content of antifogging additives in the film was 0.67% by weight, based on the total weight of the film. In spite of the admixing of copolymer in the outer interlayer II, the antifogging properties of the film remained constantly good.

EXAMPLE 5

As in Example 4, a transparent five-layer film was produced. In contrast to Example 3, the concentration of antifogging additives in the inner interlayer I was reduced from 5% by weight to 3% by weight. The total content of antifogging additives in the film was now only 0.40% by weight, based on the total weight of the film.

In spite of the reduction in the antifogging concentration in the interlayer I, a film having good antifogging properties was produced.

COMPARATIVE EXAMPLE 1

As described in Example 1, a transparent four-layer film was produced by coextrusion and subsequent stepwise orientation in the longitudinal and transverse directions. In contrast to Example 1, 1% by weight of the same antifogging additive were incorporated into each of the base layer B and the inner interlayer I and the inner top layer I. The total content of antifogging additives thus increases to 0.98% by weight, based on the total weight of the film. In addition, only the inner top layer I was corona-treated. The layers had the following composition:

Base Layer B:
98.84% by weight of propylene homopolymer having a melting point of 165° C. and a melt flow index of 3.4 g/10 min and a chain isotacticity index of 94%
0.03% by weight of neutralizer (CaCO3)
0.13% by weight of stabilizer (Irganox)
1.0% by weight of antifogging additive as in Example 1

Inner Interlayer I:
99.0% by weight of propylene homopolymer having a melting point of 165° C. and a melt flow index of 3.4 g/10 min and a chain isotacticity index of 94%, with 0.03% by weight of neutralizer (CaCO3) and 0.13% by weight of stabilizer (Irganox)
1.0% by weight of antifogging additive as in Example 1

Inner Top Layer I:
98.5% by weight of random copolymer of ethylene and propylene having a melt flow index of 6.0 g/10 min and an ethylene content of 6% by weight, based on the copolymer
0.5% by weight of SiO2 as antiblocking agent having a mean particle size of 4 μm
1.0% by weight of antifogging additive as in Example 1

Outer Top Layer II:
99.7% by weight of propylene homopolymer having a melting point of 165° C. and a melt flow index of 3.4 g/10 min and a chain isotacticity index of 94%, with 0.03% by weight of neutralizer (CaCO3) and 0.13% by weight of stabilizer (Irganox)
0.3% by weight of SiO2 as antiblocking agent having a mean particle size of 4 μm In spite of the increase in the concentration of antifogging additives, a film having significantly poorer antifogging and hot-tack properties was obtained which in addition could not be printed on the outer side owing to the lack of corona treatment.

COMPARATIVE EXAMPLE 2

Analogously to Example 2, a transparent five-layer film was produced. In contrast to Example 2, 1% by weight of antifogging additives were incorporated into each of the base layer B, the inner interlayer I and the inner top layer I. In addition, the random copolymer in the inner interlayer I was replaced by a propylene homopolymer in order to additionally promote migration of the antifogging additives to the inner top layer I.

The total content of antifogging additives thus increases to 0.98% by weight, based on the total weight of the film. The film is corona-treated on both sides. The composition of the inner interlayer I and the outer top layer II were as follows:

Inner Interlayer I:
99.0% by weight of propylene homopolymer having a melting point of 165° C. and a melt flow index of 3.4 g/10 min and a chain isotacticity index of 94%, with 0.03% by weight of neutralizer (CaCO3) and 0.13% by weight of stabilizer (Irganox)
1.0% by weight of antifogging additive combination as in Example 1

Outer Top Layer II:
99.7% by weight of propylene homopolymer having a melting point of 165° C. and a melt flow index of 3.4 g/10 min and a chain isotacticity index of 94%, with 0.03% by weight of neutralizer (CaCO3) and 0.13% by weight of stabilizer (Irganox)
0.3% by weight of SiO2 as antiblocking agent having a mean particle size of 4 μm In spite of the increase in the concentration of antifogging additives, a film having significantly poorer antifogging and hot-tack properties was obtained, and in addition the printability is reduced.

COMPARATIVE EXAMPLE 3

A film was produced as described in Example 3. In contrast to Example 3, 1% by weight of antifogging additives were incorporated into both the inner interlayer I and the inner top layer I. The total content of antifogging additive thus drops to 0.17% by weight, based on the total weight of the film.

Owing to the low antifogging concentration, the film has significant deficiencies with regard to antifogging properties and hot-tack.

The following table shows the most important film properties of the examples and comparative examples:

| Examples | Antifogging properties | | Printability | Hot tack at 140° C. [mm] |
|---|---|---|---|---|
| | Hot-fog test | Cold-fog test | | Top layer I to top layer I |
| 01 | + + + | + + + | + + + | + + |
| 02 | + + + | + + + | + + + | + + |
| 03 | + + + | + + + | + + + | + + + |
| 04 | + + + | + + + | + + + | + + + |
| 05 | + + | + + + | + + + | + + + |
| C 01 | + + | + + | − | + |
| C 02 | + | + + | + + | + |
| C 03 | − | + | + + + | + |

Assessment criteria:
+ + + very good
+ + good
+ poor
− very poor

The following measurement methods were used to characterize the raw materials and the films:

Printability:

The corona-treated films were printed 14 days after production (short-term assessment) and 6 months after production (long-term assessment). The ink adhesion was assessed by means of the adhesive-tape test. If little ink could be removed by means of an adhesive tape, the ink adhesion was assessed as moderate and if a significant amount of ink was removed, it was assessed as poor.

Antifogging Properties:

The antifogging properties of the film were determined by means of the cold-fog test and hot-fog test.

"Cold-Fog" Test:

A 250 ml beaker is filled with 200 ml of water and covered with the antifogging film in such a way that the inner top layer I of the film is facing the water. The beaker is stored at a constant 4° C. in a conditioning cabinet. The antifogging film is assessed at certain time intervals (5 min, 10 min, 20 min, 30 min, 1 h, 2 h, 3 h, 4 h, 1 d, 2 d, 3 d, 4 d and 5 d) with regard to its antifogging action, i.e. the prevention of drop-form formation of condensed water.

Assessment criteria:

| + + + | very good | film transparent, no drop formation at all |
| + + | good | film transparent, non-uniform water film |
| + | poor | poor transparency due to large drops |
| − | very poor | no transparency due to many small drops |

"Hot-Fog" Test:

A 250 ml beaker is filled with 50 ml of water and covered with the antifogging film in such a way that the inner top layer I of the film is facing the water. The beaker is stored in a water bath at a constant 60° C. The antifogging film is assessed at certain time intervals (1 min, 2 min, 5 min, 10 min, 20 min, 30 min, 1 h, 2 h, 3 h and 4 h) with regard to its antifogging action, i.e. the prevention of the formation of condensed water. The assessment criteria are analogous to the cold-fog test.

Hot Tack

The term hot tack denotes the strength of a heat-seal seam directly after the sealing operation, i.e. still in the hot/warm state (hot seam strength). To this end, a film strip with a width of 40 mm and a length of 600 mm is passed between the sealing jaws of a heat-sealing unit with the aid of a spatula and held without touching the sealing jaws. The film strip is weighted at the other end with a 200 g loading weight. The heat sealing is generally carried out at 130–150° C. with a sealing pressure of 30 N/cm$^2$ and a sealing time of 0.5 s. When the sealing jaws close, the spatula is immediately removed so that the seal seam is weighted with the loading weight at a 180° angle immediately after the opening of the sealing jaws in order to be able to test the seal seam strength better. The mm by which the seal seam is raised are measured.

Melt Flow Index

The melt flow index was measured in accordance with DIN 53 735 at a load of 21.6 N and 230° C.

Melting Point:

DSC measurement, maximum of the melting curve, heating rate 20 DEG C/min.

Haze:

The haze of the film was measured in accordance with ASTM-D 1003–52.

Gloss:

The gloss was determined in accordance with DIN 67 530. The reflector value was measured as optical parameter for the surface of a film. In accordance with the ASTM-D 523–78 and ISO 2813 standards, the angle of incidence was set at 60 DEG or 85 DEG. A light beam hits the planar test surface at the set angle of incidence and is reflected or scattered thereby. The light beams hitting the photoelectronic receiver are displayed as proportional electrical quantity. The measurement value is dimensionless and must be quoted together with the angle of incidence.

Surface Tension:

The surface tension was determined by the so-called ink method (DIN 53 364).

The invention claimed is:

1. A biaxially oriented multilayer polypropylene film comprising:
    at least one base layer B;
    a top layer I; and
    an interlayer I between said top layer I and said base layer B, said interlayer I including at least one antifogging additive in an amount of from 0.5% to 8% the weight of the interlayer I, and wherein the film has a weight and said antifogging additive comprises 0.5% to less than 1% of said weight and wherein no antifogging additive is added to said base layer B or said top layer I.

2. The multilayer polypropylene film of claim 1 wherein the base layer B includes a propylene homopolymer in an amount of at least 90% the weight of the base layer B and wherein said propylene homopolymer is built up from greater than 98% by weight of propylene units.

3. The multilayer polypropylene film of claim 1, wherein the interlayer I comprises approximately 92 to 99.5% by weight of one of propylene copolymer or a propylene terpolymer, wherein each of said propylene copolymer and said propylene terpolymer are built up from approximately 70 to 99% by weight of propylene units.

4. The multilayer polypropylene film of claim 1, wherein the antifogging additive consists of at least two components selected from the group consisting of: fatty acid esters, aliphatic alcohols, ethoxylated aromatic alcohols, mono- or polyesterified sorbitol esters, mono- or polyesterified glycerol esters, ethoxylated sorbitan esters and ethoxylated amines.

5. The multilayer polypropylene film of claim 1, wherein the antifogging additive includes at least 3 components selected from the group consisting of: fatty acid esters, aliphatic alcohols, ethoxylated aromatic alcohols, mono- or polyesterified sorbitol esters, mono- or polyesterified glycerol esters, ethoxylated sorbitan esters and ethoxylated amines.

6. The multilayer polypropylene film of claim 1, wherein the antifogging additive consists of a mixture of glycerol esters sorbitol esters and ethoxylated amines.

7. The multilayer polypropylene film of claim 1, wherein the film has an interlayer II which comprises 98 to 100% by weight of a propylene homopolymer having a propylene content of greater than 98% by weight and wherein said base layer B includes two opposing sides, said interlayer I being on a first side and said interlayer II being on a second and said interlayer II being disposed between said base layer B and a top layer II.

8. The multilayer polypropylene film of claim 1 further including an interlayer II comprising a maximum of 70% by weight of a propylene homopolymer having a propylene content of greater than 98% by weight and at most 30% by weight of one of propylene copolymer or propylene terpolymer and wherein said base layer B includes two opposing sides, said interlayer I being on a first side and said interlayer II being on a seecond side and said interlayer II being disposed between said layer B and a top layer II.

9. The multilayer polypropylene film of claim 1, wherein the top layer I comprises 95 to 100% by weight of one of a propylene copolymer or a propylene terpolymer and wherein each of said propylene copolymer and said propylene terpolymer have a propylene content from 70 to 98% by weight.

10. The multilayer polypropylene film of claim 1, further including a top layer II including at least 98% by weight of a propylene homopolymer having a propylene content of greater than 98% by weight.

11. The multilayer polypropylene film of claim 1 further including a top layer II which comprises a maximum of 70% by weight of a propylene homopolymer having a propylene content of greater than 98% by weight and at most 30% by weight of one of a propylene copolymer or a propylene terpolymer.

12. The multilayer polypropylene film of claim 11, wherein the top layer II has a surface and the film is printed on the surface of the top layer II.

13. The multilayer polypropylene film of claim 1 wherein said film includes two sides and wherein said film is formed by the process of treating said sides with a process selected from the group consisting of corona-treating, flame-treating and plasma-treating.

14. The multilayer polypropylene film of claim 1, further including a top layer II having a surface that is treated with a process selected from the group consisting of corona-treating, flame-treating and plasma-treating.

15. A process of using the multilayer polypropylene film of claim 1 as packaging film for the packaging of products having a high water content, characterized in that the top layer I faces the products.

16. The multilayer polypropylene film of claim 1 further including a top layer II having a surface, and wherein a transparent adhesive is applied to the surface of the top layer II for adhering the film to a transparent sheet of material.

17. The multilayer polypropylene film of claim 1 further including a top layer II having a surface, and wherein an adhesion promoter is applied to the surface of the top layer II for adhering the film to transparent sheets of material.

18. The multilayer polypropylene film of claim 1, wherein the interlayer I comprises approximately 92 to 99.5% by weight of a propylene copolymer, propyleneterpolymer or a mixture thereof wherein each of said propylene copolymer and said propylene terpolymer are built up from approximately 70 to 99% by weight of propylene units.

19. The multilayer polypropylene film of claim 1 further including a interlayer II comprising a maximum of 70% by weight of a propylene homopolymer having a propylene content of greater than 98% by weight and at most 30% by weight of a propylene copolymer propylene terpolmer or a mixture thereof and wherein said base layer B includes two opposing sides, said interlayer I being on a first side and said interlayer II being on a second side.

20. The multilayer polypropylene film of claim 1, wherein the top layer I comprises 95 to 100% by weight of a propylene copolymer propylene terpolymer or a mixture thereof and wherein each of said propylene copolymer and said propylene terpolymer have a propylene content of from 70 to 98% by weight.

21. The multilayer polypropylene film of claim 1 further including a top layer II which comprises a maximum of 70% by weight of a propylene homopolymer having a propylene content of greater than 98% by weight and at most 30% by weight of a propylene copolymer, propylene terpolymer or a mixture thereof.

22. A biaxially oriented multilayer polypropylene film comprising:
at least one base layer B comprising at least 90% by weight of a propylene homopolymer built up from greater than 98% by weight of propylene units;
a top layer I; and
an interlayer I including antifogging additives in an amount of 0.5 to 8% by weight of the interlayer, and wherein the antifogging additives comprise 0.5% to less than 1% by weight of the combined weights of the base layer B, the top layer I, and the interlayer I and no antifogging additive is added to said base layer B or said top layer I.

23. A biaxially oriented multilayer polypropylene film comprising:
at least one base layer B;
a top layer I; and an interlayer I including antifogging additives in an amount of 0.5 to 8% by weight of the interlayer, and wherein the antifogging additives comprise 0.5 to less than 1% by weight of the combined weights of the base layer B, the top layer I, and the interlayer I and wherein the antifogging additives consist of at least two components selected from the group consisting of fatty acid esters, aliphatic alcohols, ethoxylated aromatic alcohols, mono- or polyesterified sorbitol esters, mono- or polyesterified glycerol esters, ethoxylated sorbitan esters and ethoxylated amines and wherein no antifogging additive is added to said base layer B and said top layer I.

* * * * *